(12) United States Patent
Lain et al.

(10) Patent No.: US 7,930,763 B2
(45) Date of Patent: Apr. 19, 2011

(54) METHOD OF AUTHORISING A COMPUTING ENTITY

(75) Inventors: Antonio Lain, Stoke Gifford Bristol (GB); Patrick Goldsack, Stoke Gifford Bristol (GB); Brian Quentin Monahan, Stoke Gifford Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1073 days.

(21) Appl. No.: 11/490,652

(22) Filed: Jul. 21, 2006

(65) Prior Publication Data

US 2007/0101125 A1    May 3, 2007

(30) Foreign Application Priority Data

Oct. 29, 2005  (GB) .................................. 0522096.7

(51) Int. Cl.
G06F 7/04      (2006.01)
G06F 17/30     (2006.01)
H04N 7/16      (2006.01)

(52) U.S. Cl. ............. 726/29; 729/29; 713/168; 713/200

(58) Field of Classification Search ...................... 726/29
See application file for complete search history.

(56) References Cited

U.S. PATENT DOCUMENTS

| 6,134,550 | A | 10/2000 | Van Oorschot et al. |
| 6,948,064 | B2 * | 9/2005 | Smith et al. .................... 713/168 |
| 2002/0147905 | A1 | 10/2002 | Perlman |
| 2003/0130947 | A1 * | 7/2003 | Benantar .......................... 705/44 |

FOREIGN PATENT DOCUMENTS

| EP | 1 434 384 A1 | 6/2004 |
| GB | 2432433 | 4/2010 |

OTHER PUBLICATIONS

Great Britain Examination Report for GB application No. GB0522096.7, dated Apr. 19, 2010, pp. 3.

* cited by examiner

*Primary Examiner* — Taghi T. Arani
*Assistant Examiner* — Mahfuzur Rahman

(57) ABSTRACT

A method of authorizing a computing entity comprises obtaining at the authorizing entity a delegation chain of intermediate elements through which an authorisable entity asserts authorization eligibility in the form of a sequence of locally assigned labels for the elements. The method further comparing the label sequence against a label sequence template.

14 Claims, 4 Drawing Sheets

METHOD OF AUTHORISING A COMPUTING ENTITY

FIELD OF THE INVENTION

The invention relates to a method of authorizing a computing entity.

BACKGROUND OF THE INVENTION

Interactions between remote computing entities can require security across open communication channels such as the Internet. One known security measure comprises the public key infrastructure using a system of asymmetric keys as shown in FIG. 1. A system includes two computing entities, reference numeral 100 and Y reference numeral 102 which is desired to communicate with one another. Each of entities X and Y store respective private keys PRIVKX and PRIVKY and in addition could publish complementary public keys PUBKX, PUBKY for example then a server 104.

The private key and public key comprise complementary asymmetric functions. If a message is operated on by one of those functions it can only be decrypted when operated on by the other function. The public key and private key are not easily derivable from one another, hence the asymmetry. As a result if data is operated on by a private key for signing purposes then the public key can be used to prove that the entity who encrypted the message was the holder of the public key (as no one else will have the corresponding private key), therefore, authenticating the message. In practice, instead of encrypting the whole message, typically a hash comprising a "digest" of the message is created, providing a short data stream comprising a unique value relevant to the message. If the message is changed the digest will also change, and the digest is encrypted for authentication purposes. Conversely if the message is sent to a third party using the third party's public key to encrypt it only the third party can decrypt the message using their corresponding private key. For example, one way for an originator or requestor entity X to secure a transaction with a third party entity Y involves encrypting the transaction with entity Y's public key, and sign it with entity X's own private key, so that entity Y can authorize the transaction based on the public key of the entity X.

When it is desired to take authorization decisions not only based on the public key of the requester but on additional information associated with that entity, a certification system can be used. For example in order to prove that entity X is authorized it obtains a certificate from a commonly trusted third party certificate authority CA1, reference numeral 106. The certificate concatenates inter alia CA1's public key PUBK CA1 and entity X's public key PUBKX with and signs it with CA1's private key. As a result the certificate can be validated as coming from CA1 using CA1's public key PUBK CA1 obtained for example from trusted server 104 and this extra information on entity X (that it is authorized by CA1) used for an authorization decision.

When entity X instigates a request with entity Y, therefore, the transaction designated generally 108 comprises three parts, a certificate 108a, an encrypted message 108b and a signature of the message, 108c. The encrypted message 108b is encrypted using entity Y's public key. The signature of the message is obtained by using X's private key.

Upon receipt of the transaction, node Y checks the certificate using the trusted third party's public key PUBK CA1 which will show information on that entity X that can be used for authorizing the transaction, since is provided by a trusted third party CA1 Y then decrypts the encrypted message using its private key. Entity Y also checks the authenticity and integrity of the message by verifying its signature with X's public key. Although all transactions between entities X and Y can be handled in this manner, alternatively this approach can be used to start a session that negotiates a shared key for example as in Secure Sockets Layer (SSL) after which a secure channel can be implemented between the entities in the appropriate manner and transactions later negotiated over that channel are known to be safe.

In some instances a chain of certificates is implemented in which, for example, a root trust authority CA2 reference numeral 110 issues a certificate to CA1 signed by CA2's private key PRIVK CA2. Various systems exist for checking the certificate chain. For example according to the International Standard ITU-T X.509 (referred to here as "X.509"), the certificate from CA1 is effectively used for connectivity linking X's public key (and other information on X) to a trust assumption relating to CA2. In particular an authorisable entity X seeking authorization is checked at the authorizing entity Y to ensure that it has knowledge of the correct private key (for example by verifying with X's public key a signature) and that the immediate trusted third party providing certification (for example CA1) is accepted by delegation from a root of trust CA2. Therefore, the information associated to X's public key in the certificate can be used to decide whether X can perform the requested transaction.

BRIEF SUMMARY OF THE INVENTION

A method of authorizing a computing entity comprising obtaining at an authorizing entity a delegation chain of intermediate elements through which an authorisable entity asserts authorization eligibility in the form of a sequence of locally assigned labels for the elements. The method further comprises comparing information derived from the delegation chain comparing the label sequence against a label sequence template.

BRIEF DESCRIPTION OF THE DRAWINGS

Embodiments of the invention will now be described, by way of example only, with reference to the figures.

DETAILED DESCRIPTION OF THE INVENTION

Figure 1:
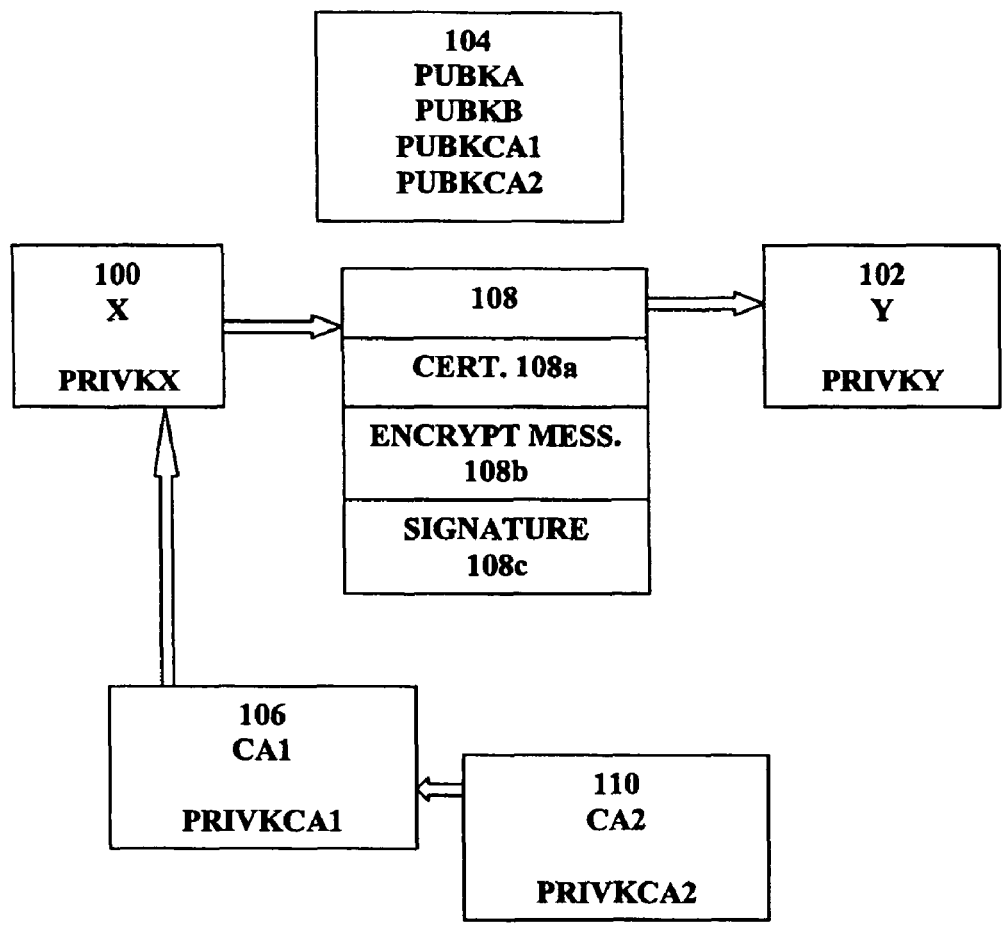
FIG. 1 is a schematic diagram showing an authorization scheme between distributed computing entities.
Figure 2:
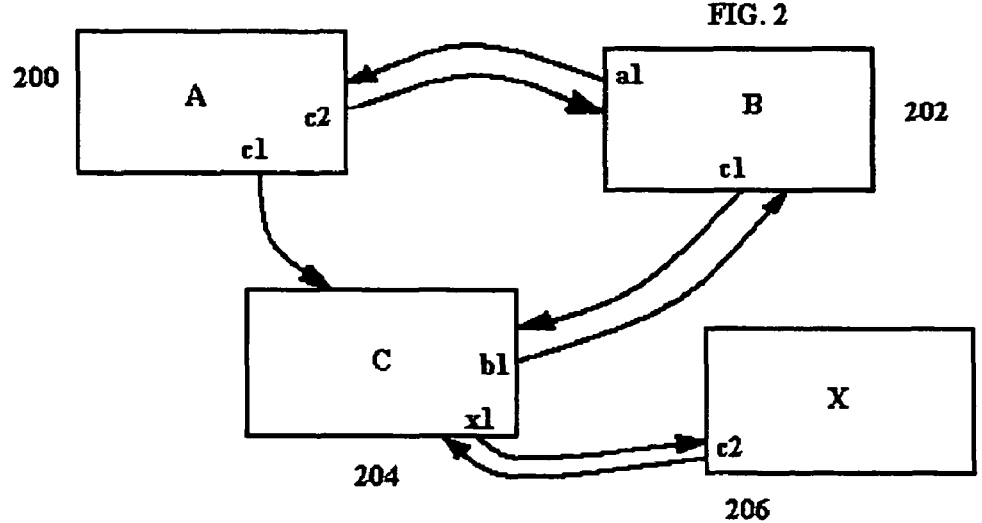
FIG. 2 is a network diagram showing distributed entities supporting an authorization method as described herein.
Figure 3:
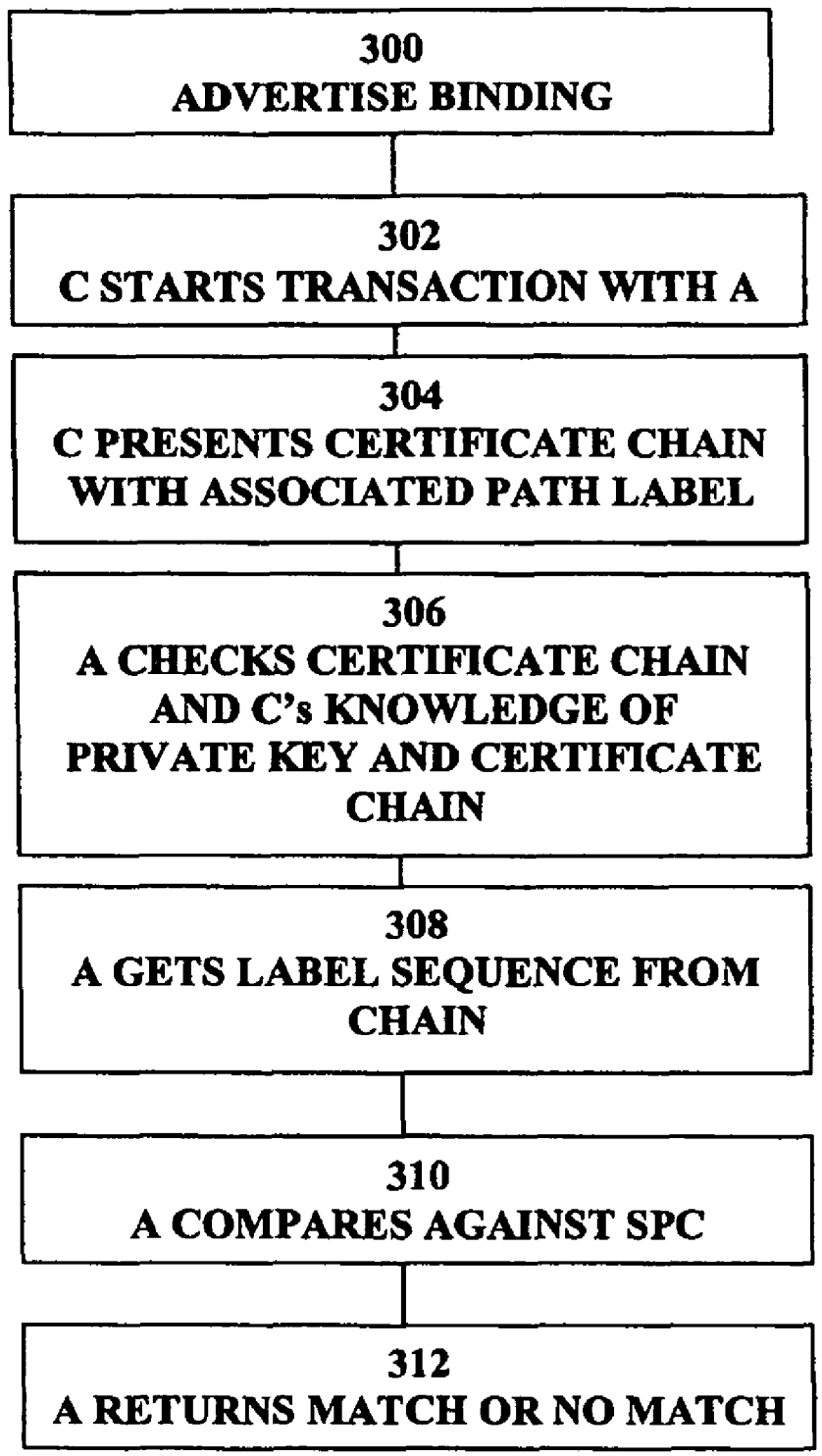
FIG. 3. is a flow diagram showing in overview a method of authorization as described herein.

In overview the method described herein can be understood with reference to the schematic network diagram of FIG. 2 and the flow diagram of FIG. 3. Referring firstly to FIG. 2 a plurality of remote computing entities A, B, C and X reference numerals 200, 202, 204, 206 are provided. The entities are in communication by any appropriate means such a communication network (now shown), for example the Internet. As a result additional security requirements are desired for interactions between the computing entities. For example entity A may be a server allowing access to a website, entity C may be a work station desiring access to the website via entity A and entity B may be an intermediary processor through which entity C seeks access to entity A.

In the diagram shown the network of entities is represented as a directed labeled graph with each entity A, B, C, X as a node which can be identified by its public key. In addition "local bindings" between pairs of nodes are associated with labels assigned to the links or edges between a bound target node and source node. The binding is maintained by the source entity and can be represented by a locally assigned label and the public key of the target entity. It will be noted that labels are not unique—for example both entity A and entity B use labels c1. Similarly multiple local bindings can share the same target entity. Accordingly the binding effectively provides a source node's name or label for a target node. The bindings may be made and the labels attributed on configuration of each of the entities or dynamically as appropriate.

Multiple bindings that traverse a path in the graph form elements of a delegation chain of trusts that can be validated in other steps. For example, in FIG. 2, A binds C with label c1 and B with label c2. B binds C with label c1 and A with label a1. C binds B with label b1 and X with label x1 and X binds C with label c2. Hence the path from A to C is in FIG. 2 which includes as multiple bindings A's binding with B and B's binding with C, and which can be represented c2:c1, may be used to validate a direct transaction between C and A on the basis that an indirect chain of trust via B already exists.

Referring now to FIG. 3, in step 300 each source entity "advertises" its bindings, i.e. the label and public key of the target entity. It will be appreciated that this advertisement can be in any appropriate manner for example by provision into a global database or simply by responding to peer requests for binding information. For example, when an entity wants to make a binding visible it can issue a certificate, signed by its private key, of any appropriate type linking its own public key and the label and the public key of the target entity. An implementation of these certificates can use standard X.509 certificates and embed the label in optional fields.

In step 302 an authorisable entity, for example entity C, commences a transaction with an authorizing entity for example entity A. This may be, for example, a request from entity C comprising a host computer terminal, to access a web resource from entity A directly rather than via intermediary entity B. Alternatively, for example this could be a communication session or SSL session. Alternatively, again, for example, entity C could deploy an object for execution at entity A and indeed any kind of transaction either dynamic or static between an authorisable entity and an authorizing entity may be intended.

In order for entity A to authorize entity C, according to the methods described herein, entity C effectively presents the delegation chain on which it relies including entity B in the form of a path label sequence or chain including, as chain elements, a sequence of intermediate elements corresponding to the labels assigned to the bindings representing the various delegations in the path to entity A. Entity A performs a pattern match on the label to ensure that the chain is permissible. As described in more detail below, in particular, where the delegation chain is via entity B then entity C wishes to rely on the path label c2:c1 to assert its eligibility for authorization. It will be noted that the communication channel between entities A and C may be entirely unrelated to the path defined by the path label which is purely for the purposes of obtaining authorization credentials for the direct transaction between the entities.

At step 304, therefore, entity C presents its delegation or certificate chain that represents a path label from entity A in the form of a label sequence, linking the bindings as described above to represent delegation and in particular adding A's local binding with public key of B under label c2 to B's binding with public key of C under label c1 to provide c2:c1. It will be noted that the linked binding may also be made publicly available to third parties in any appropriate manner and the path label presented by C from A may be derived at A or C in any appropriate manner. For example it may be manually configured or can be derived dynamically at run time, for example during new interactions between entities or pulled by A from a server or database carrying the relevant information. It will further be seen that the bindings can be presented as a certificate checked such as an X.509 certificate chain where each certificate contains the relevant binding information as described above.

However the delegation chain is derived by the authorisable entity C, and however it is represented, it must be first checked at the authorizing entity to ensure that the chain is a permissible one such that the transaction can be authorized. As part of a first check at step 306, therefore, entity A checks that the authorisable entity C is the claimed entity in particular by ensuring that it proves knowledge of its private key. This can be done in any appropriate manner. For example where entity C has provided an X.509 certificate chain associated with a SSL session then the standard X.509 validation check within the SSL protocol will provide this information. In addition the authorizing entity A ensures that the certificates have not expired or been revoked and that the certificate chain can be linked to the local trust assumptions, which basic requirements can also be met by the standard X.509 validation.

Also as part of the first check at step 306 the authorizing entity checks that there are no cycles in the certificate chain. Such a cycle would occur, for example, where entity B delegates entity C which in turn delegates entity B, which possibility is not supported under most implementations of checkers of X.509 certificate chains. For example entity A can carry out a check using the public key values embedded in the certificate chain. As a result the authorizing entity can be satisfied that the authorisable entity is who they assert to be, that the certificate chain is correct and that there are no cycles which allows the method described herein to be embedded in an X.509 certificate structure.

At step 308 the authorizing entity (entity A) derives the label sequence for the purposes of additional pattern matching as described below. The label sequence (for example c2:c1) can be derived, for example, from the certificate chain. Where X.509 certificates are used then the label of a binding can be encoded in an appropriate field such as SubjectAltName such that the path label can be derived from those fields.

Reverting to the example in which entity A provides access to a web resource and entity C wishes to access that web resource, the steps described can be further understood. The web resource, for example, may be user banking information corresponding to the user terminal at entity C. Previously, entity C may have accessed the resource via entity B. This could be the case, for example, where server A has set up an access control list effectively only allowing access to that account if the access request is received from entity B, which may be a remote server providing banking services, for example. In addition entity A may have specified that entity B has authority to authorize one or more parties to access their account information, and entity B may have sub-authorised entity C accordingly. In that case entity A provides a binding with entity B which it gives the label c2. Entity B creates a binding with entity C which it locally assigns the label c1. Entity A may then be configured also to accept direct requests from entities authorized by entity B for access to their user account. In particular, this could be achieved using an appropriate ACL. Then, if entity C directly applies to entity A for access to its user account details then entity A can check whether entity C is authorized appropriately. As discussed in more detail below, this can be done by comparing the sequence of labels representing the delegation chain from A through B to C against a template held at entity A.

Accordingly, as a next step it is necessary to ensure that the delegation sequence is permissible. To render the system manageable, it is desirable to ensure that it is not necessary to enumerate all valid path labels for example in an access control list (ACL) such that they are used directly as the basis of an access control system as this would require the enforcing or authorizing entity to know a priori the exact delegation sequence of all possible valid clients i.e. authorisable entities. In particular, at step 310 the authorizing entity then compares the label sequence against a label sequence template. The label sequence template comprises a set of expressions indicating a set of core requirements which the label sequence must meet expressed, for example, using a set of regular expressions known from language theory of the type well known to the skilled reader.

The label sequence templates can be provided in the form of a simple path constraint (SPC) which can be configured on the authorizing entity for example in the form of an attribute in its description. As a result a policy is defined in the form of an ACL such that only authorisable entities who present a delegation chain meeting at least one of its SPCs are authorized. Hence the policy is attached to the SPC and not to a specific name or path label as a result of which a global semantic determining how the policy needs to be applied to names or identities is not required. Furthermore, as each entity can have multiple bindings with a common label a path label may describe a group of entities allowing mapping of federated groups using this approach simply by adopting appropriate labels.

In order for the approaches described herein to use X.509 functionality, "simple paths" that is to say, delegation chains without cycles, are required. In order to reduce the complexity of matching such paths, a restricted set of expressions which can be used in an SPC to express a permissible label sequence is used. As a result the computational burden of matching is reduced, decreasing processing time.

Hence, as discussed in more detail below, the SPC's are expressed as a series of constraints on to which the path label is mapped to see whether it corresponds to an acceptable label sequence template. For example the SPC may start with the permitted expression "SELF" meaning that the allowed label sequence should start with the entity applying the ACL, i.e. entity A in the example discussed above. In fact the label sequence corresponding to a request from entity C is fully expressed as "SELF: c1:c2". Alternatively a different starting point in the label path may be identified as permissible where a remote entity is appropriately trusted by specifying its public key in the SPC. However the SPC may contain further constraints for example dictating all or part of the path leading up to the root. For example it may be permitted that any third party entity may form a pre-determined portion of the path, for example where another entity upstream of those entities in the path is appropriately trusted to delegate. A specific sequence of matching labels may also be specified as part of the SPC.

Following the matching step between the path label and the SPC at step 310, at step 312 the authorizing entity either obtains a match or does not obtain a match and finds the authorisable entity eligibility assertion true or false accordingly.

Accordingly in the case of the example discussed above in which an entity C wishes to transact directly with an authorizing entity A rather than via an intermediate entity B, entity A checks the label sequence SELF: c2:c1 against its ACL and, if a match is found, initiates a transaction directly with entity C. It will be noted that C can present the certificate chain to A or entity A can concatenate the sequence with own label c2 and C's presented label c1.

Figure 4:
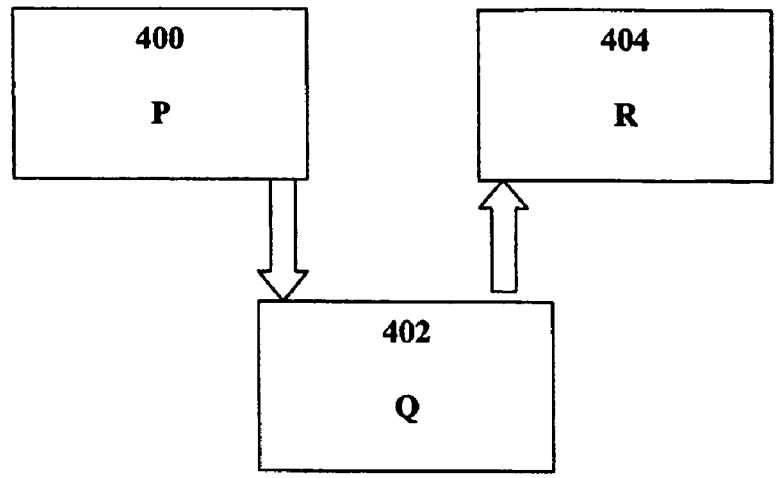
FIG. 4. shows an alternative authorisable interaction according to the method described herein.

As an alternative example the authorization scheme can be used to enforce component-level access control for deployment and interaction in SmartFrog. This can be understood with reference to FIG. 4 in which a distributed computer system includes computing entities P, reference numeral 400, Q reference numeral 402 and R, reference numeral 404 communicating by any appropriate means. In this case computing entity P may comprise an originator originating a component description but leaving some parts incomplete such that entity Q, acting as scheduler, can complete those parts for example by indicating locations of remote entities such as an executor, entity R, which will deploy tasks within the description Then it may be necessary at entity R to check both the description as a whole is authentic and that the changes made by the scheduler and indeed the identity of the schedules are authorized. A configuration of this kind is described in a co-pending application commonly assigned herewith and entitled "A method of providing a validatable data structure" filed on the same day under reference no HP200504146. Once again this can be achieved using SPCs and path labels. To carry out a global check at entity R, entity P includes in the signed top-level description a certificate chain or path label P-Q, Q-R which R can then check against its own pre-configured SPC to authorize the transaction. In addition entity Q can introduce its own path label in conjunction with those parts of the description that it has changed which again can be pre-configured or can, for example, be learnt dynamically from entity P which once again entity R can check against its SPC's to ensure that the changes made by and identity of the scheduler are permitted.

As a result of this approach, an authorizing entity can ensure that an authorisable entity has been permissibly delegated by ensuring that the path label matches a pre-determined template. Furthermore because policies are attached to SPC's then this system is easier to federate than, for example, X.509 where attributes are linked to a distinguished name with a hierarchical naming scheme and requiring global uniqueness. Yet further the equivalence of a path label and an edge according to the method described herein ensures that a straightforward comparison against the SPC is appropriate, and the provision of a limited set of constraints which can be expressed within the SPC provides for a manageable check.

As a result the approach described herein allows authorization in large scale distributed systems without a clear hierarchical structure because of the lack of reliance on globally unique names. In addition the use of path label constraints provides a tight control over delegation. Furthermore because only simple paths are used and the constraints are limited that can be imposed on path labels a more intuitive framework is provided that can be easily embedded in existing X.509 certificate technologies.

The manner in which the method described herein is implemented will now be described in more detail with reference in particular to the SmartFrog distributed computing system which will be well known to the skilled reader and can be understood, for example, from http://www.smartfrog.org which is incorporated herein by reference.

It will be recognized of course that the approaches described herein can be incorporated into any appropriate computing language and distributed system.

First the form of SPC's and the constraints imposed on the expressions contained therein will be described in more detail. In particular a possible family of formulations restricting regular expressions to a restricted list of matching element types to improve performance will be described.

The list of matching element types comprises:

SELF: matches the public key of the entity that is evaluating the ACL. In the previous discussion any path label is implicitly started by SELF. As a result, referring to FIG. 2, when entity C is authorizing itself with entity A with the label path c2:c1, uses, more exactly, the SPC (SELF:c2:c1).

PUBKEY (with value "pub", a public key): matches an entity with a given public key "pub".

PATTERN (with value "pat", a string pattern matching expression): satisfies all bindings with labels that can be matched by the given expression "pat". For example this can support simple patterns with "*", e.g., "c_*_" matches c_122_, c_3_and c_. Furthermore arbitrary patterns represented by regular expressions can be added with a small impact in complexity.

NOBODY: it matches no bindings. As a result access can be denied to anyone

DOTS: it matches a possibly empty sequence of arbitrary bindings. When it appears on its own, it allows anyone to access it, i.e., it matches any bindings.

In general the constraints are that the starting point of the chain is defined, optionally followed by a finite set of single-label matching elements using an arbitrary procedure, also optionally followed by any node reachable from any of the previously matched ones, and the end point must of course correspond with the authorisable entity. Again, in most cases it is desirable to restrict traversals to simple paths having no cycles.

The individual matching element types are formulated as an SPC in the form of a sequence setting out a set of constraints which a path label must match. A SPC "m" is formed by a sequence of matching elements (m_1:m_2: . . . :m_n). A matching element m_i could be of type SELF, PUBKEY, PATTERN, NOBODY or DOTS. A valid SPC should either just contain the elements (NOBODY) or (DOTS) or start by SELF or PUBKEY followed by a (possibly empty) sequence of PATTERN elements and (possibly) finished by a DOTS element. This can be expressed as (NOBODY)|(DOTS)| ((SELF|PUBKEY): (PATTERN)*: (DOTS)?) For example, possible valid SPCs could have types (SELF:DOTS) or (PUBKEY:PATTERN:PATTERN) or (NOBODY) or (SELF: PATTERN:DOTS) or (SELF) or (PLBKEY) but not (SELF: PUBKEY) or (SELF:DOTS:PATTERN) or (SELF:NOBODY) or (PATTERN:PATTERN)

The implementation of the SPCs can be further understood with reference to the distributed entities A, B, C, X shown in FIG. 2. Where A acts as authorizing element, the following examples apply:

(SELF)—only A satisfies this SPC such that it will not authorize external transactions.

(SELF: c*)—A satisfies this ACL since it satisfies (SELF) and both B and C also match since c* matches c1 and c2. However X does not satisfy it since, after matching (SELF:c*) the path label element x1 is still to be matched.

(SELF:c1:x1) is satisfied by A and C since they satisfy the shorter SPCs (SELF) or (SELF:c1) as well as X through the simple path A-C-X where C acts as an intermediate entity. However B does not satisfy the ACL as c2 does not match c1 and b1 does not match x1.

Turning to the specific matching algorithm to match syntactically valid SPC "m" having elements (m_1: m_2: . . . :m_n) with a path label "p" (p_1:p_2: . . . :p_s) it will be seen that the SPC constraints can be applied to path labels to identify whether there is a match or not. When "m" starts with a PUBKEY element, we need to know "rootPubKey", i.e., the public key of the root certificate in the certificate chain presented. When "m" starts with a SELF element, this root key should match the public key of the entity doing the evaluation. As described above, the SPCs may be configured at the authorizing entity, and may for example be an attribute in the entity description in the SmartFrog model. Similarly the path labels presented by the authorisable entity may also be configured at the authorisable entity such that it simply has to retrieve and present the path labels, or they may be learnt dynamically as appropriate.

In overview the matching algorithm is recursively applied on the elements of the SPC and the path label if a complete match owns such that there are no further elements to process, the a matching condition is met. However the SPC has been fully traversed and there are non-matched pending elements in the path label then a non-matching condition is returned.

In addition a matching condition can be returned in the case that a non-empty path label matches a shorter SPC as an authorisable entity can always create additional "dummy entities" to extend the path label and prove any longer SPC.

Figure 5:
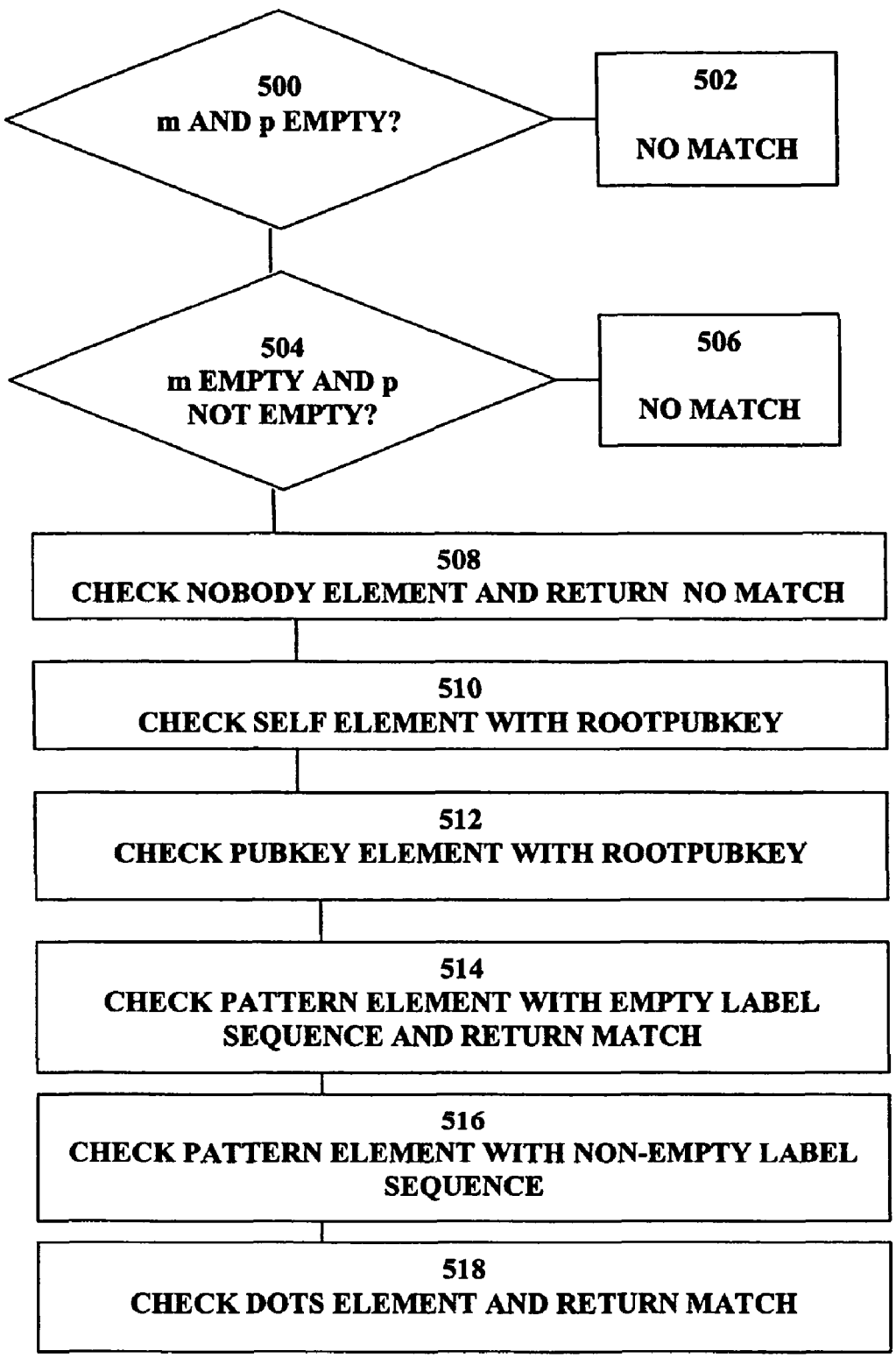
FIG. 5 is a flow diagram showing matching of a path label with an SPC.

The algorithm can further be understood with reference to the flow diagram of FIG. 5 where m comprises the SPC, p comprises the path label and rootPubKey the root public key of the certificate chain. The algorithm can be repeated for each path label against every SPC matching element as appropriate At step 500, if m and p are both empty then at step 502 a match is returned. Otherwise at step 504, if m is empty and p is not empty then there are path label elements not matched and so no match is returned at 506.

At step 508, if the first element in m (m_1) is NOBODY then no match is returned as no element is matched. At step 510, if (m_1) is SELF and rootPubKey matches the evaluator's public key we proceed to match the next SPC element, otherwise we return a no match.

At step 512 if the first element in m (m_1) is PUBKEY and m_1 matches rootPubKey then we continue with the next SPC element, otherwise we return a no match.

At step 514, if (m_1) is PATTERN and p is empty then a match is returned as the path label matched a subset of the SPC. At step 516 if (m_1) is PATTERN and p is not empty then m_1 and p_1 are compared and if successful we continue with the next SPC and path label elements, otherwise we return a no match.

Finally at step 518 if (m_1) is DOTS then a match is returned as this means that any sequence of path label elements is acceptable.

The algorithm can be used to efficiently enumerate all the entities that satisfy a particular ACL based on SPCs because it relies effectively on overlaying a typically small number of label pattern matching elements.

The steps illustrated with reference to FIG. 5 can further be understood in relation to the following listing:

Listing 1

```
Boolean match(SPC m(m_1:m_2:...:m_n), PathLabel
p (p_1:p_2:....:p_s), PublicKey
rootPubKey) {
    if(m is empty) AND (p is empty)
        //perfect match!
        return true;
    if(m is empty) AND (p is NOT empty)
        // remaining path label elements still not matched
        return false;
    // m is NOT empty
    case of (m_1) {
        NOBODY:
            // matches no elements
            return false;
```

SELF:

```
if(rootPubKey equals "my_own_key") {
    // I was the root of the certificate chain as expected
    return match(m_2:...:m_n, p, rootPubKey);
} else {
    // the certificate chain was not rooted with my key
    return false;
}
```

PUBKEY:

```
if(rootPubKey equals m_1) {
    // matches root public key of the authenticated certificate chain
    return match(m_2:...:m_n, p, rootPubKey);
} else {
    // the certificate chain was not rooted by m_1
    return false;
}
```

PATTERN:

```
if(p is empty) {
            //The path label matched a sub-set of SPC, it could generate
            // the rest with dummy keys anyway...
            return true;
// match the string p_1 with pattern m_1
} else if m_1.match(p_1){
        return match(m_2:....:m_n, p_2:....p_s, rootPubKey):
} else {
    return false;
}
```

DOTS:

```
            // match any sequence of path label elements
            return true;
        }
    }
```

It will be recognized that the specific approaches and programming techniques described herein can be implemented as appropriate by the skilled reader without the need for detailed discussion here. In particular standard X.509 techniques can be used in conjunction with SmartFrog and the algorithms and approaches described above. In particular the X.509 mechanism for certificate path validation (including certificate revocation) can be implemented simply by assuming that either the authorizing entity or the one specified in a PUBKEY element is the only certificate authority trusted. Furthermore existing software to generate X.509 certificates can be implemented, the additional labels being embedded in the SubjectAltName or other suitable fields and then being extracted to run the matching algorithm as appropriate.

Figure 6:
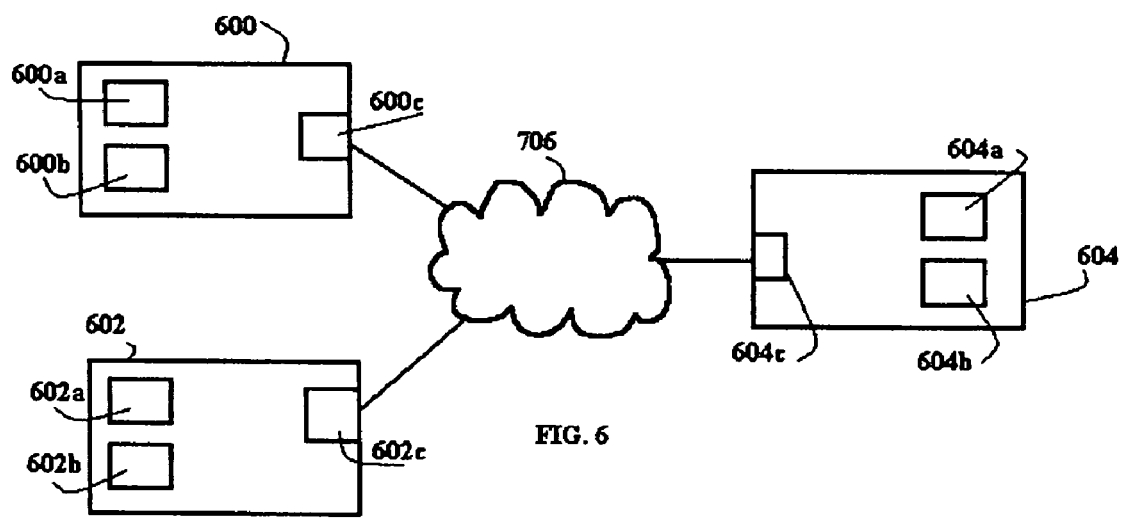
FIG. 6 is a schematic diagram showing a distributed computer system in relation to which the method described herein can be implemented.

The computing entities can form part of a distributed computing system of any appropriate type and the individual entities thereof can be any appropriate platform or system. For example referring to FIG. 6 each computing entity may comprise a conventional computing entity 600, 602, 604 including respectively a data processor 600a, 602a, 604a a memory 600b, 602b, 604b and an input/output interface for sending and receiving communications between the entities 600c, 602c, 604c. Communication may be via any appropriate network 606 such a local area network (LAN), the Internet or any other appropriate means. It will further be seen that each of the individual entities may be in a common physical location but comprise individual trusted entities such that security measures of the type described above are required to validate communications between them.

By using a restricted regular grammar to represent valid label paths and enforcing that there are no cycles in the paths, an efficient embedding of the bindings and path labels is provided using existing X.509 certificate solutions suitable for large-scale distributed systems and providing control over delegation chains. The coupling of the certificate chain check and comparison of the path label against SPC makes the system simpler to integrate with SSL, java, jar file signing tools or other tools using X.509 certificates.

It will be appreciated that the binding and checking operation can be implemented in any appropriate manner and that labels can be assigned using any allocation scheme. Any appropriate certification and encryption approach can be adopted and the approaches described herein can be implemented in relation to any interaction or transaction between computing entities where authorization is required and where a delegation chain can be defined in any appropriate manner.

The invention claimed is:

1. A method of authorizing a computing entity comprising:
obtaining, at an authorizing entity, a delegation chain of intermediate elements through which an authorisable entity asserts authorisation eligibility in the form of a sequence of locally assigned labels for the intermediate elements, the sequence of locally assigned labels being derivable from a certificate chain;
checking for cycles in the certificate chain; and
comparing the sequence of locally assigned labels against a label sequence template;
wherein the authorisable entity is authorized if a matching condition is identified between the sequence of locally assigned labels and the label sequence template.

2. A method as claimed in claim 1 in which the matching condition comprises one of an exact match between the label sequence and the label sequence template and a match between a sub-set of labels in the sequence and the label sequence template.

3. A method as claimed in claim 1 in which the authorizing entity obtains the label sequence in an authorization transaction with an authorisable entity.

4. A method as claimed in claim 1 in which the authorizing entity obtains the label sequence from a data structure originating at the authorisable entity.

5. A method as claimed in claim 1 in which a label in the sequence corresponds to a binding between a delegator entity and a delagatee entity.

6. A method as claimed in claim 5 in which the label is locally assigned by the delegator entity.

7. A method as claimed in claim 1 in which the label sequence template comprises at least one label sequence template element constraint.

8. A method as claimed in claim 7 in which the label sequence template element constraints are limited to the set of: a matching starting point criterion; a sequence of label-matching chain elements with a deny/permit criterion; an element with an absolute deny/permit criterion; and a matching element for an arbitrary sequence of labels criterion.

9. The method of claim 1 wherein obtaining a delegation chain of intermediate elements through which an authorisable entity asserts authorization eligibility in the form of a sequence of locally assigned labels for the intermediate elements comprises receiving said delegation chain of intermediate elements from the authorisable entity seeking authorization.

10. The method of claim 1, wherein the authorisable entity is not authorized if cycles are found in the certificate chain.

11. A computer readable non-transitory medium containing instructions arranged to operate a processor to:
    obtain, at an authorizing entity, a delegation chain of intermediate elements through which an authorisable entity asserts authorisation eligibility in the form of a sequence of locally assigned labels for the intermediate elements, the sequence of locally assigned labels being derivable from a certificate chain;
    check for cycles in the certificate chain; and
    compare the sequence of locally assigned labels against a label sequence template;
    wherein the authorisable entity is authorized if a matching condition is identified between the sequence of locally assigned labels and the label sequence template.

12. The method of claim 11, wherein the authorisable entity is not authorized if cycles are found in the certificate chain.

13. An apparatus for authorizing a computing entity comprising: a processor communicatively coupled to a memory, said processor being configured to execute code stored on said memory that causes said processor to:
    obtain a delegation chain of intermediate elements through which an authorisable entity asserts authorization eligibility in the form of a sequence of locally assigned labels for the delegation chain of intermediate elements, the sequence of locally assigned labels being derivable from a certificate chain;
    check for cycles in the certificate chain;
    compare the sequence of locally assigned labels against a label sequence template; and
    authorize the authorisable entity if a matching condition is identified between the sequence of locally assigned labels and the label sequence template.

14. The method of claim 13, wherein the authorisable entity is not authorized if cycles are found in the certificate chain.

* * * * *